(12) United States Patent
Aida et al.

(10) Patent No.: US 7,381,760 B2
(45) Date of Patent: Jun. 3, 2008

(54) PIGMENT DISPERSION AND USE THEREOF

(75) Inventors: Seiji Aida, Tokyo (JP); Shinya Fujimatsu, Tokyo (JP); Kaori Nakano, Tokyo (JP); Shinichi Sato, Tokyo (JP); Daisuke Tanabe, Tokyo (JP)

(73) Assignee: Toyo Ink Mfg.Co., Ltd., Tokyo (JP)

( * ) Notice: Subject to any disclaimer, the term of this patent is extended or adjusted under 35 U.S.C. 154(b) by 572 days.

(21) Appl. No.: 10/878,254

(22) Filed: Jun. 29, 2004

(65) Prior Publication Data

US 2004/0266911 A1  Dec. 30, 2004

(30) Foreign Application Priority Data

Jun. 30, 2003 (JP) ............................. 2003-186584

(51) Int. Cl.
- *C08J 3/00* (2006.01)
- *C08K 3/20* (2006.01)
- *C08L 39/00* (2006.01)
- *C08L 67/00* (2006.01)
- *C09D 11/00* (2006.01)

(52) U.S. Cl. ................. 523/160; 106/31.6; 106/31.75; 523/161; 524/500; 524/513; 524/555; 524/601; 524/714

(58) Field of Classification Search ................. 523/160, 523/161; 106/31.6, 31.75; 524/500, 714, 524/513, 555, 601

See application file for complete search history.

(56) References Cited

U.S. PATENT DOCUMENTS

| | | | |
|---|---|---|---|
| 2,855,403 A | 10/1958 | McKellin et al. | |
| 2,965,511 A | 12/1960 | Moser | |
| 3,370,971 A | 2/1968 | Linton | |
| 4,057,436 A | 11/1977 | Davies et al. | |
| 4,224,212 A | 9/1980 | Topham | |
| 5,472,490 A * | 12/1995 | Sawamura et al. | ......... 106/413 |
| 5,753,022 A * | 5/1998 | Schofield et al. | ........... 106/412 |
| 5,760,257 A | 6/1998 | Tanaka et al. | |

FOREIGN PATENT DOCUMENTS

| | | |
|---|---|---|
| EP | 0 208 041 | 1/1987 |
| EP | 0 768 321 | 4/1997 |
| FR | 2 285 443 | 4/1976 |
| FR | 2 397 226 | 2/1979 |
| JP | 41-2466 | 2/1941 |
| JP | 63-305137 | 12/1988 |
| JP | 1-247468 | 10/1989 |
| JP | 3-26767 | 2/1991 |
| JP | 6-67463 | 3/1994 |
| JP | 07292305 A * | 11/1995 |
| JP | 8-38875 | 2/1996 |
| WO | WO 95/17473 | 6/1995 |
| WO | WO 01/80987 A2 * | 11/2001 |

OTHER PUBLICATIONS

Machine Translation of JP 07292305 A (1995).*
Machine Translation of JP 08038875 A (1996).*

* cited by examiner

*Primary Examiner*—Patrick Niland
(74) *Attorney, Agent, or Firm*—Oblon, Spivak, McClelland Maier & Neustadt, P.C.

(57) ABSTRACT

The invention relates to a pigment dispersion comprising: a condensate of or a salt between a polyallylamine and a polyester having a free carboxylic acid or the salt; a pigment derivative represented by the following general formula (1); a pigment; and an organic solvent, $$(P-X)^-[N(R_1, R_2, R_3, R_4)]^+ \quad \text{general formula (1)}$$

wherein p represents an organic dyestuff residue; X represents a sulfonic acid group or a carboxylic acid group; $R_1$ represents an alkyl group having 5 to 20 carbon atoms; and $R_2$, $R_3$ and $R_4$ each independently represents a hydrogen atom or an alkyl group having 1 to 20 carbon atoms.

19 Claims, No Drawings

PIGMENT DISPERSION AND USE THEREOF

BACKGROUND OF THE INVENTION

1. Field of the Invention

The present invention relates to a pigment dispersion, an ink-jet ink and a printing ink containing the same.

2. Description the Related Art

In general, in the case of producing printed inks, ink-jet inks and the like, it is difficult to stably disperse a pigment at a high concentration. It is known that the incorporation of the pigment having a high concentration into the ink may cause various problems during a production process and in products themselves. For example, a dispersion containing a pigment which comprises fine particles often exhibits a high viscosity. Therefore, it becomes difficult to take the dispersion out of a dispersing machine or to transport it. Moreover, such a dispersion gels sometimes during storage, with the result that even its use may be difficult. Furthermore, the dispersion sometimes causes state defects such as less gloss and insufficient leveling on the surface of color-developed materials. Additionally, in the case that such a dispersion contains a different kind of pigment, there sometimes appear color separation due to aggregation, uneven coloration of color-developed materials by precipitation or the like, and noticeable decrease of a coloring power.

In order to solve such various problems as mentioned above, methods for stably dispersing the pigment have been proposed. For example, such methods are disclosed in U.S. Pat. Nos. 3,370,971 and 2,965,511, Japanese Patent Publication No. S41-2466 and U.S. Pat. No. 2,855,403. Moreover, there have been proposed some methods for mixing a certain kind of varnish with a pigment derivative as a dispersant including a pigment as a main structure and having a substituent such as an acidic group or a basic group in a side chain thereof. Such methods are disclosed in, for example, Japanese Patent Laid-open Nos. S63-305137, H01-247468, and H03-26767. In addition, there has been suggested a method of adding copper phthalocyanine-sulfonic acid and a dispersant containing a polyalkylene-imine at a time when the pigment is dispersed. This technique is disclosed in Japanese Patent Publication No. H06-67463.

However, a satisfactory effect has been not necessarily obtained, and thus a technique which is more excellent in a dispersing effect has been desired.

SUMMARY OF THE INVENTION

One embodiment of the present invention is directed to a pigment dispersion comprising: a condensate of or a salt between a polyallylamine and a polyester having a free carboxylic acid; a pigment derivative represented by the following general formula (1); a pigment; and an organic solvent,

$(P-X)^- [N(R_1, R_2, R_3, R_4)]^+$          general formula (1)

wherein: P represents an organic dyestuff residue selected from azo, benzimidazolon, phthalocyanine, quinacridone, anthraquinone, dioxazine, diketopyrrolopyrrole, quinophthalone, isoindolinone, isoindoline, perylene, perynone, flavanthrone, pyranthrone and anthrapyrimidine; X represents a sulfonic acid group or a carboxylic acid group; $R_1$ represents an alkyl group having 5 to 20 carbon atoms; and $R_2$, $R_3$ and $R_4$ each independently represents a hydrogen atom or an alkyl group having 1 to 20 carbon atoms.

Another embodiment of the present invention is directed to the above pigment dispersion, wherein the number-average molecular weight of the condensate of or the salt between the polyallylamine and the polyester having the free carboxylic acid is from 1,000 to 100,000.

Still another embodiment of the present invention is directed to the above pigment dispersion, wherein the polyester having the free carboxylic acid is: a condensate of a hydroxycarboxylic acid; a polymer of a lactone; or a mixed condensate of a hydroxycarboxylic acid and a lactone.

A further embodiment of the present invention is directed to the above pigment dispersion, wherein the weight blend ratio of: the condensate of or the salt between the polyallylamine and the polyester having the free carboxylic acid; the pigment derivative represented by the general formula (1); and the pigment is from 5:1:100 to 200:15:100.

According to one embodiment of the present invention, there can be provided a pigment dispersion which is excellent in dispersibility, flowability, and storage stability and which is excellent in use applicability for printing inks, ink-jet inks and the like.

The present disclosure relates to subject matter contained in Japanese Patent Application No.2003-186584, filed on Jun. 30, 2003, the disclosure of which is expressly incorporated herein by reference in its entirety.

DETAILED DESCRIPTION OF THE INVENTION

A condensate of or a salt between a polyallylamine and the polyester having a free carboxylic acid, and a pigment derivative represented by the general formula (1) in the present invention can be synthesized by known methods in accordance with characteristics of a pigment dispersion to be produced.

The condensate of or the salt between the polyallylamine and the polyester having the free carboxylic acid can be obtained by mixing and heating the polyallylamine and the polyester having the free carboxylic acid to carry out amidation by dehydration. Various condensates or salts are produced in accordance with reaction conditions, i.e., a charging ratio of the polyallylamine and the polyester having the free carboxylic acid, molecular weights of the polyallylamine and the polyester having the carboxylic acid, a conversion of the amidation, and the like. Therefore, the reaction conditions can control a molecular weight, an amine value, and an acid value of the obtained dispersant. The condensate or the salt preferably has a number-average molecular weight of 1,000 to 100,000. The amine value is preferably from 2 to 50, more preferably from 4 to 20. The acid value is preferably from 2 to 50. When the molecular weight of the condensate or the salt, i.e., the dispersant, is too small, the dispersing effect and storage stability of a pigment deteriorate. When the molecular weight of the dispersant is too large, a viscosity of the dispersion increases and its solubility in various organic solvents deteriorates, and these facts invite poor dispersing characteristics. The amine value and the acid value have a great influence on the solubility of the condensate of the polyallylamine and the polyester having the free carboxylic acid or the salt and its adsorbability onto the pigment. Within the above preferable ranges of the amine value and the acid value, the most large effect can be obtained.

The polyallylamine for use in the present invention is preferably represented by the following general formula (2):

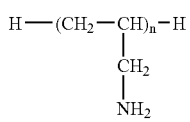

general formula (2)

wherein "n" represents an integer of 2 to 1,000.

The polyester having the free carboxylic acid is preferably: a condensate of a hydroxycarboxylic acid; a polymer of a lactone; or a mixed condensate of a hydroxycarboxylic acid and a lactone. Examples of the hydrocarboxylic acid include ricinolic acid, a mixture of 9- and 10-hydroxystearic acids, 12-hydroxystearic acid, castor oil fatty acids, hydrogenated castor oil fatty acids, and lactic acid. Examples of the lactone include ε-caprolactone, β-propiolactone, γ-butyrolactone, δ-valerolactone, β-methyl-δ-valerolactone, 4-methylcaprolactone, and 2-methylcaprolactone. Preferred polyester having the free carboxylic acid is a single condensate or polymer of 12-hydroxystearic acid or ε-caprolactone, or a mixed condensate from a mixture thereof. At the time of the polycondensation of these polyesters, a carboxylic acid containing no hydroxy group may be added as a polymerization terminator. Examples of the polymerization terminator include caproic acid, lauric acid, stearic acid, and methoxyacetic acid.

The "P" in the pigment derivative represented by the general formula (1) represents an organic dyestuff residue. The chemical structure of the pigment to be used in a printing ink or an ink-jet ink is not necessarily coincident with the chemical structure of the organic dyestuff residue. However, in consideration of the hue of the ink to be finally produced, a pigment dispersion excellent in hue can be produced by use of a pigment derivative having hue similar to that of the pigment to be dispersed, e.g., a yellow pigment derivative in the case of a yellow pigment, a red pigment derivative in the case of a red pigment, and a blue pigment derivative in the case of a blue pigment, or a colorless pigment derivative.

Moreover, the pigment derivative represented by the general formula (1) exerts a remarkable effect on dispersion by salt-formation of the pigment derivative containing a sulfonic acid group or a carboxylic acid group with an amine. When the substituent of the derivative is still an acidic form, e.g., sulfonic acid or carboxylic acid, the effect cannot be expected. Examples of the amine include: primary amines such as octylamine and dodecylamine; secondary amines such as dioleylamine and distearylamine; tertiary amines such as dimethyllaurylamine and dimethylstearylamine; and quaternary ammoniums such as trimethylammonium and dimethyldistearylammonium. Preferred are primary amines and quaternary ammoniums.

The weight mixing ratio of: the condensate of or the salt between the polyallylamine and the polyester having the free carboxylic acid; the pigment derivative represented by the general formula (1); and the pigment is preferably from 5:1:100 to 200:15:100, more preferably from 10:1:100 to 80:10:100. When the amounts of the dispersant and pigment derivative are too small relative to the amount of the pigment to be dispersed, an aimed dispersing effect cannot be obtained. When the amounts of the dispersant and pigment derivative are too large, durability of the color-developed material decreases and hence the case is not preferred.

The pigment for use in the present invention may be any of various pigments for use in printing inks, ink-jet inks, and the like. Such pigments include soluble azo pigments, insoluble azo pigments, phthalocyanine pigments, quinacridone pigments, isoindolinone pigments, isoindoline pigments, perylene pigments, perynone pigments, dioxazine pigments, anthraquinone pigments, dianthraquinonyl pigments, anthrapyrimidine pigments, anthanthrone pigments, indanthrone pigments, flavanthrone pigments, pyranthrone pigments, diketopyrrolopyrrole pigments, and the like. More specific examples of pigments which are represented by generic names of Color Indexes include pigment Black 7, pigment Blue 15, 15:1, 15:3, 15:4, 15:6 and 60, pigment Green 7 and 36, pigment Red 9, 48, 49, 52, 53, 57, 97, 122, 144, 146, 149, 166, 168, 177, 178, 179, 185, 206, 207, 209, 220, 221, 238, 242, 254 and 255, pigment Violet 19, 23, 29, 30, 37, 40 and 50, pigment Yellow 12, 13, 14, 17, 20, 24, 74, 83, 86, 93, 94, 95, 109, 110, 117, 120, 125, 12.8, 137, 138, 139, 147, 148, 150, 151, 154, 155, 166, 168, 180 and 185, and pigment Orange 13, 36, 37, 38, 43, 51, 55, 59, 61, 64, 71 and 74. In addition, as for carbon blacks, all of neutral, acidic and basic carbon blacks can be used.

As the organic solvent for use in the present invention, there can be widely utilized organic solvents which are used in printing inks, ink-jet inks, and the like. The solvent is not particularly limited so long as it is an organic solvent capable of dissolving or homogeneously dispersing the condensate of or the salt between the polyallylamine and the polyester having the free carboxylic acid. Specific examples of the organic solvent include: alcohols such as methyl alcohol, ethyl alcohol, n-propyl alcohol, isopropyl alcohol and n-butyl alcohol; ketones such as acetone, methyl ethyl ketone, methyl n-propyl ketone, methyl isopropyl ketone, methyl n-butyl ketone, methyl isobutyl ketone, methyl n-amyl ketone, methyl isoamyl ketone, diethyl ketone, ethyl n-propyl ketone, ethyl isopropyl ketone, ethyl n-butyl ketone, ethyl isobutyl ketone, di-n-propyl ketone, diisobutyl ketone, cyclohexanone, methylcyclohexanone and isophorone; esters such as methyl acetate, ethyl acetate, n-propyl acetate, isopropyl acetate, n-butyl acetate, isobutyl acetate, hexyl acetate, octyl acetate, methyl lactate, propyl lactate and butyl lactate; glycols and glycol ethers such as ethylene glycol, ethylene glycol monoisopropyl ether, ethylene glycol monobutyl ether, ethylene glycol monohexyl ether, diethylene glycol monomethyl ether, diethylene glycol monoethyl ether, diethylene glycol monobutyl ether, ethylene glycol dimethyl ether, ethylene glycol diethyl ether, diethylene glycol dimethyl ether, diethylene glycol diethyl ether, propylene glycol, propylene glycol monomethyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monodipropyl ether and tripropylene glycol monomethyl ether; glycol acetates such as ethylene glycol monomethyl ether acetate, ethylene glycol monoethyl ether acetate, ethylene glycol methylene glycol monohexyl ether, diethylene glycol monomethyl ether acetate, diethylene glycol monoethyl ether acetate, diethylene glycol monobutyl ether acetate, propylene glycol monomethyl ether acetate, propylene glycol monomethyl ether, propylene glycol monoethyl ether acetate, propylene glycol monobutyl ether acetate and dipropylene glycol monomethyl ether acetate; saturated hydrocarbons such as n-hexane, isohexane, n-nonane, isononane, dodecane and isododecane, unsaturated hydrocarbons such as 1-hexene, 1-heptene and 1-octene; cyclic saturated hydrocarbons such as cyclohexane, cycloheptane, cyclooctane, cyclodecane and decalin; cyclic unsaturated hydrocarbons such as cyclohexene, cycloheptene, cyclooctene, 1,1,3,5,7-cyclooctatetraene and cyclododecene; and aromatic hydrocarbons such as benzene, toluene and xylene. These organic solvents may be used singly or as a mixture of two or more of them.

The pigment dispersion of the present invention can be used as various printing inks and ink-jet inks. In order to impart fixing properties at color development thereof, a resin may be incorporated. Examples of usable resins include petroleum resins, casein, shellac, rosin-modified maleic acid resins, rosin-modified phenol resins, nitrocellulose, cellulose acetate butyrate, cyclized rubbers, chlorinated rubbers, oxidized rubbers, hydrochlorinated rubbers, phenol resins, alkyd resins, polyester resins, unsaturated polyester resins, amino resins, epoxy resins, vinyl resins, vinyl chloride resins, vinylidene chloride resins, vinyl chloride-vinyl acetate resins, ethylene-vinyl acetate resins, acrylic resins, methacrylic resins, polyurethane resins, silicone resins, fluorocarbon resins, drying oils, synthetic drying oils, styrene-maleic acid resins, styrene-acrylic resins, polyamide resins, and butyral resins.

In the pigment dispersion of the present invention, there can be used various additives such as a plasticizer, a surface regulator, a UV inhibitor, a light stabilizer, an antioxidant, an antiblocking agent, a defoaming agent, a viscosity-regulator, a wax, a surfactant, and a leveling agent in accordance with a use application of the pigment dispersion.

The pigment dispersion of the present invention may be incorporated with a polymerizable monomer or oligomer in the organic solvent and the resulting dispersion may be used as a radiation-curable ink capable of being cured by a ultraviolet ray or an electric beam.

The pigment dispersion of the present invention is produced by: dissolving or dispersing a condensate of or the salt between a polyallylamine and a polyester having the free carboxylic acid in an organic solvent; putting a pigment derivative represented by the general formula (1) and a pigment into the organic solvent; stirring and mixing the whole by means of a high-speed mixer or the like until it becomes homogeneous; and dispersing it using one of various dispersing machines such as beads mills and roller mills including a horizontal sand mill, a vertical sand mill, and an annular sand mill, and a media-less dispersing machine. Moreover, the pigment derivative may be mixed with the pigment beforehand by adding the derivative during production of the pigment.

The condensates of or the salt between a polyallylamine and a polyester having a free carboxylic acid in the present invention were synthesized by known methods. They are shown in the following Table 1 as dispersants. Moreover, the pigment derivatives represented by the general formula (1) were also synthesized by known methods. They are shown in the following Table 2.

The Number-average molecular weight (Mn) was determined by using gel permeation chromatography (GPC) of which standard material was polystyrene.

To determine the Acid Value, the dispersant dissolved in THF was titrated with 0.1N potassium hydroxide in ethanol.

Acid Value(KOH mg/g)=(a×5.61)/s a: Volume of 0.1N KOH (ml)

S: Weight of the dispersant

The Amine Value means total amount of amine value of primary, secondary and tertiary amines. To obtain the value, the dispersant dissolved in ethanol was titrated with 0.2N hydrochloric acid in ethanol. The value is shown as an amount of KOH(mg) which is equivalent amount of HCl required for the neutralization of 1 g of the dispersant.

Amine Value(KOH mg/g)=(a×0.20×56.1)/S

A: Volume of 0.2N KOH (ml)

S: Weight of the dispersant

TABLE 1

| | Dispersant | | | | |
|---|---|---|---|---|---|
| | A | B | C | D | E |
| Polyester | 12HSA/ε-CL | ε-CL | 12HSA/ε-CL | 12HSA | 12HSA/ε-CL |
| Polyester mixing ratio | 1/19 | 1 | 1/22 | 1 | 1/24 |
| Mn of Condensate or Salt | 2,500 | 14,000 | 5,000 | 19,000 | 62,000 |
| Acid Value mgKOH/g | 18 | 9 | 17 | 38 | 17 |
| Amine Value mgKOH/g | 6 | 18 | 9 | 20 | 11 |

12HSA: 12-Hydroxystearic acid
ε-CL: ε-Caprolacton

TABLE 2

| | Pigment Derivative | | | | |
|---|---|---|---|---|---|
| | A | B | C | D | E |
| P | Copper phthalocyanine | Copper phthalocyanine | Quinacridone | Benzimidazolone | Disazo Yellow |
| X | Sulfonic acid group | Sulfonic acid group | Sulfonic acid group | Sulfonic acid group | Carboxylic acid group |
| Carbon number of $R_1$ | Mixture of 8~18 | 12 | Mixture of 14~18 | 18 | Mixture of 8~18 |
| $R_2$ | H | Lauryl | H | Stearyl | H |
| $R_3$ | H | Methyl | H | Methyl | H |
| $R_4$ | H | Methyl | H | Methyl | H |

EXAMPLES

The following will specifically describes the present invention with reference to examples but the invention is not particularly limited to the examples. It is to be noted that "part(s)" in the examples represents "part(s) by weight".

Example 1

A pigment dispersion was obtained by dissolving 12.5 parts of the dispersant A shown in Table 1 in 47.5 parts of ethylene glycol monobutyl ether acetate, putting 5.0 parts of the pigment derivative A and 35 parts of LIONOL BLUE FG-7351 (copper phthalocyanine pigment manufactured by Toyo Ink Mfg. Co., Ltd.) therein, stirring and mixing the solution by means of a high-speed mixer for about 30 minutes until it was homogeneous, and then dispersing the resulting mill base in a 0.6 L horizontal sand mill for 1 hour per 1 kg of the mill base.

Example 2

A pigment dispersion is obtained by dispersing in the same manner using respective the dispersant B and the pigment derivative B instead of the dispersant A and the pigment derivative A in Example 1.

Example 3

A pigment dispersion was obtained by dissolving 10.0 parts of the dispersant C shown in Table 1 in 63.5 parts of butyl lactate, putting 1.5 parts of the pigment derivative C and 25 parts of HOSTAPERM RED E5B 02 (quinacridone pigment manufactured by Clariant International Ltd.) therein, stirring and mixing the solution by means of a high-speed mixer for about 30 minutes until it was homogeneous, and then dispersing the resulting mill base in a 0.6 L horizontal sand mill for 1 hour per 1 kg of the mill base.

Example 4

A pigment dispersion was obtained by dissolving 14.0 parts of the dispersant D shown in Table 1 in 49.0 parts of diethylene glycol monoethyl ether acetate, putting 2.0 parts of the pigment derivative D shown in Table 2 and 35 parts of HOSTAPERM YELLOW H4G (benzimidazolone pigment manufactured by Clariant International Ltd.) therein, stirring and mixing the solution by means of a high-speed mixer for about 30 minutes until it was homogeneous, and then dispersing the resulting mill base in a 0.6 L horizontal sand mill for 1.2 hour per 1 kg of the mill base.

Example 5

A pigment dispersion was obtained by dissolving 10.5 parts of the dispersant E shown in Table 1 in 58.0 parts of ethylene glycol monobutyl ether acetate, putting 1.5 parts of pigment derivative E shown in Table 2 and 30 parts of NOVOPERM YELLOW 4G (disazo pigment manufactured by Clariant International Ltd.) therein, stirring and mixing the solution by means of a high-speed mixer for about 30 minutes until it was homogeneous, and then dispersing the resulting mill base in a 0.6 L horizontal sand mill for 1.2 hour per 1 kg of the mill base.

Example 6

A pigment dispersion was obtained by dissolving 15.0 parts of the dispersant A shown in Table 1 in a mixed solvent of 20 parts of propylene glycol monomethyl ether acetate and 32.9 parts by weight of dipropylene glycol monomethyl ether, putting 2.1 parts of the pigment derivative C shown in Table 2 and 30 parts of CROMOPHTAL PINK PT (dimethylquinacridone pigment manufactured by Ciba Specialty Chemicals K.K.) therein, stirring and mixing the solution by means of a high-speed mixer for about 30 minutes until it was homogeneous, and then dispersing the resulting mill base in a 0.6 L horizontal sand mill for 1.5 hour per 1 kg of the mill base.

Comparative Example 1

A pigment dispersion is obtained in the same manner with no use of the pigment derivative A in Example 1.

Comparative Example 2

A pigment dispersion is obtained in the same manner with use of Solsperse 12000 (copper phthalocyaninesulfonic acid manufactured by Avecia Ltd.) instead of the pigment derivative A in Example 1.

Comparative Example 3

A pigment dispersion is obtained in the same manner with use of Disperbyk-111 (acidic polymer dispersant manufactured by BYK Chemie) instead of the dispersant C in Example 3 and with no use of the pigment derivative C.

Comparative Example 4

A pigment dispersion is obtained in the same manner with use of Solsperse 32000 (polyalkyleneimine-base polymer dispersant manufactured by Avecia Ltd.) instead of the dispersant D and with no use of the pigment derivative D in Example 1.

Comparative Example 5

A pigment dispersion is obtained in the same manner with use of Disperbyk-111 (acidic polymer dispersant manufactured by BYK Chemie) instead of the dispersant E in Example 5.

Comparative Example 6

A pigment dispersion is obtained in the same manner with use of Solsperse 32000 (polyethyleneimine-base polymer dispersant manufactured by Avecia Ltd.) instead of the dispersant A in Example 6.

The pigment dispersions obtained in Examples 1 to 6 and Comparative Examples 1 to 6 were evaluated on the following items: (1) viscosity, (2) dispersed particle size, and (3) storage stability. Measuring methods of them are shown in the following.

(1) Viscosity: Each pigment dispersion was prepared at 25° C., and then measured on Viscomate VM-100A (an ultrasonic vibration viscometer manufactured by Yamaichi Electronics Co., Ltd.).
(2) Dispersed particle size: Each pigment dispersion was diluted 200 times to 1000 times with ethyl acetate and a 50% diameter on the basis of volume was measured by a Microtrack UPA150 (a wet-type particle size analyzer manufactured by Nikkiso Co., Ltd.).
(3) Storage stability: Each pigment dispersion was placed in a glass bottle, and after stored in a constant-temperature chamber at 70° C. for 1 week for aging, changed viscosities of the pigment dispersion before and after the aging were measured. The viscosity measurement at this time was carried out in the same manner as in the viscosity measurement of the above (1). When a rate of change of the viscosity was within ±10%, the ink was ranked as ◯, and when the rate of change of the viscosity exceeded ±10%, the ink was ranked as ×.

The following Tables 3 and 4 summarize results of evaluation and composition of each of the pigment dispersions of Examples 1 to 6 and Comparative Examples 1 to 6.

TABLE 3

| | Example | | | | | |
|---|---|---|---|---|---|---|
| | 1 | 2 | 3 | 4 | 5 | 6 |
| Dispersant | A | B | C | D | E | A |
| Derivative | A | B | C | D | E | C |
| Piegment | Copper phthalocyanine | Copper phthalocyanine | Quinacridone | Benzimidazolone | Benzimidazolone | Dimethyl quinacridone |
| Solvent | BGAc | BGAc | Butyl lactate | EDGAc | BGAc | PGMAc MPDG |
| Viscosity (mPa · s) | 98 | 140 | 160 | 120 | 110 | 155 |
| Particle Size(mm) | 150 | 160 | 240 | 257 | 170 | 140 |
| Dispersion | ○ | ○ | ○ | ○ | ○ | ○ |
| Storage Stability | ○ | ○ | ○ | ○ | ○ | ○ |

TABLE 4

| | Comparative Example | | | | | |
|---|---|---|---|---|---|---|
| | 1 | 2 | 3 | 4 | 5 | 6 |
| Dispersant | A | A | BYK-111 | SP32000 | BYK-111 | SP32000 |
| Derivative | — | SP12000 | — | — | E | C |
| Pigment | Copper phythalocyanine | Copper phythalocyanine | Quinacridone | Benzimidazolone | Benzimidazolone | Dimethyl quinacridone |
| Solvent | BGAc | BGAc | Butyl lactate | EDGAc | BGAc | PGMAc MPDG |
| Viscosity (mPa · s) | 850 | 320 | 380 | 320 | 190 | 270 |
| Particle Size(mm) | 215 | 230 | 295 | 480 | 280 | 170 |
| Dispersion | X | X | X | X | X | ○ |
| Storage Stability | X | X | X | X | X | X |

BGAc: Ethylene glycol monobutyl ether acetate

EDGAc: Diethylene glycol monoethyl ether acetate

PGMAc: Propylene glycol monomethyl ether acetate

MPDG: Dipropylene glycol monomethyl ether

BYK-111: Disperbyk-111 (polymer dispersant manufactured by

Byk Chemie: acidic group-containing type)

SP32000: Solsperse 32000 (polymer dispersant manufactured by

Avecia Ltd.: main chain of polyethyleneimine)

SP12000: Solsperse 12000 (pigment derivative manufactured by

Avecia Ltd.: copper phthalocyaninesulfonic acid)

The pigment dispersions of Examples 1 to 6 were excellent in dispersibility and storage stability as described in Table 3. Most of the pigment dispersions of Comparative Examples 1 to 6 were poor in dispersibility and the pigment dispersions were poor in storage stability as described in Table 4.

Next, the pigment dispersions of Examples 1 to 6 and Comparative Examples 1 to 6 were prepared as respective ink-jet inks in accordance with the following formulation. Then, each ink was subjected to a printing test on a poly vinyl chloride sheet MD5 (manufactured by Metamark Ltd.) using IP-6500 (a large-sized ink-jet printer manufactured by Seiko I Infotech Inc.). As a result, the inks in which the pigment dispersions of Examples 1 to 6 were used were excellent in print aptitude. However, with regard to the inks in which the pigment dispersions of Comparative Examples 1 to 6 were used, it was hardly possible to discharge the inks from the printer head.

Pigment dispersion 16.0 parts
Cyclohexanone 20.0 parts
Ethylene glycol monobutyl ether acetate 47.0 parts
Diethylene glycol monoethyl ether acetate 10.0 parts
Vinyl resin VYHD (vinyl chloride-vinyl acetate resin manufactured by Dow Chemical Company) 7.0 parts Examples 7 to 11, Comparative Examples 7 to 12

Ten parts of one of the pigments shown in Tables 5 and 6, 1 part of any one of Dispersants A to E shown in Table 1, 0.5 part of any one of the pigment derivatives A to E shown in Table 2, 40 parts of a varnish for gravure inks (15% of a urethane resin, 65% of ethyl acetate, and 20% of isopropyl alcohol), and 300 parts of 3 mm glass beads were mixed and dispersed for 60 minutes in a paint conditioner to prepare a gravure ink. The respective inks were prepared as Examples 7 to 11. As the above urethane resin, there was used a urethane resin containing a urea bond having a weight-average molecular weight of about 30000 prepared by chain extension, with isophoronediamine, of a prepolymer obtained by polycondensation between isophorone diisocyanate and a polyester polyol resulting from polycondensation between 3-methyl-1,5-pentanediol and adipic acid.

As Comparative Examples 7 to 12, there were prepared a gravure ink containing Solperse 24000 (polyalkylimine-base polymer dispersant manufactured by Avecia Ltd.) instead of the dispersant shown in Table 1, a gravure ink containing no pigment dispersion, and a gravure ink containing Solperse 12000 (copper phthalocyaninesulfonic acid manufactured by Avecia Ltd.) instead of the pigment derivative shown in Table 2.

Tables 5 and 6 show viscosities of the prepared inks and gloss values of dry films. The viscosity of the ink was measured by a B-type viscometer at 6 rpm. The gloss (60°) of the dry film when the ink was color-developed on a film with a bar-coater, was measured with a gloss meter (Micro-TRI-Gloss manufactured by BYK Gardner).

TABLE 5

|  | Example | | | | |
| --- | --- | --- | --- | --- | --- |
|  | 7 | 8 | 9 | 10 | 11 |
| Dispersant | A | B | C | D | E |
| Derivative | A | B | C | D | E |
| Pigment | PB15:3 | PB15:3 | PR122 | PY180 | PY14 |
| Viscosity (mPa · s) | 800 | 1100 | 648 | 770 | 1540 |
| Gloss(%) | 82.0 | 75.0 | 66.0 | 78.5 | 69.1 |

TABLE 6

|  | Comparative Example | | | | | |
| --- | --- | --- | --- | --- | --- | --- |
|  | 7 | 8 | 9 | 10 | 11 | 12 |
| Dispersant | A | A | SP24000 | SP24000 | SP24000 | SP24000 |
| Derivative | — | SP12000 | A | C | D | E |
| Pigment | PB15:3 | PB15:3 | PB15:3 | PR122 | PY180 | PY14 |
| Viscosity (mPa · s) | 32500 | 12400 | 3400 | 5800 | 2140 | 5890 |
| Gloss(%) | 58.2 | 34.3 | 68.3 | 44.7 | 61.6 | 45.1 |

SP24000: Solsperse 24000 (polymer dispersant manufactured by
Avecia Ltd.: main chain of polyethyleneimine)
SP12000: Solsperse 12000 (pigment derivative manufactured by
Avecia Ltd.: copper phthalocyaninesulfonic acid)
Pigment was shown by generic name of Color Index (PB: Pigment Blue, PR: Pigment Red, PY: Pigment Yellow)

The pigment dispersions containing the dispersant and the pigment derivative of the present invention exhibit a low viscosity and an excellent flowability in all the pigments, and they are further excellent in glossiness of coated films.

It should be understood that the foregoing relates to only a preferred embodiment of the invention, and it is intended to cover all changes and modifications of the examples of the invention herein chosen for the purposes of the disclosure, which do not constitute departures from the sprit and scope of the invention.

What is claimed is:

1. A pigment dispersion, comprising:
    a condensate of or a salt between polyallylamine and a polyester having a free carboxylic acid group;
    a pigment derivative represented by the following formula (1);
    a pigment; and
    an organic solvent:

$$(P-X)^-[N(R_1, R_2, R_3, R_4)]^+ \qquad \text{formula (1)}$$

wherein P represents an organic dyestuff residue selected from the group consisting of azo, benzimidazolone, phthalocyanine, quinacridone, anthraquinone, dioxazine, diketopyrrolopyrrole, quinophthalone, isoindolinone, isoindoline, perylene, perynone, flavanthrone, pyranthrone and anthrapyrimidine; X represents a sulfonic acid group or a carboxylic acid group; $R_1$ represents an alkyl group having 5 to 20 carbon atoms; and $R_2$, $R_3$ and $R_4$ each is a hydrogen atom.

2. The pigment dispersion according to claim 1, wherein the number-average molecular weight of the condensate of or the salt between the polyallylamine and the polyester having the free carboxylic acid ranges from 1,000 to 100,000.

3. The pigment dispersion according to claim 1, wherein the polyester having the free carboxylic acid is: a condensate of a hydroxycarboxylic acid; a polymer of a lactone; or a mixed condensate of a hydroxycarboxylic acid and a lactone.

4. The pigment dispersion according to claim 2, wherein the polyester having the free carboxylic acid is: a condensate of a hydroxycarboxylic acid; a polymer of a lactone; or a mixed condensate of a hydroxycarboxylic acid and a lactone.

5. The pigment dispersion according to claim 1, wherein the weight blend ratio of: the condensate of or the salt between the polyallylamine and the polyester having the free carboxylic acid; the pigment derivative represented by the formula (1); and the pigment ranges from 5:1:100 to 200:15:100.

6. The pigment dispersion according to claim 2, wherein the weight blend ratio of: the condensate of or the salt between the polyallylamine and the polyester having the free carboxylic acid; the pigment derivative represented by the formula (1); and the pigment ranges from 5:1:100 to 200:15:100.

7. The pigment dispersion according to claim 3, wherein the weight blend ratio of: the condensate of or the salt between the polyallylamine and the polyester having the free carboxylic acid; the pigment derivative represented by the formula (1); and the pigment ranges from 5:1:100 to 200:15:100.

8. The pigment dispersion according to claim 4, wherein the weight blend ratio of: the condensate of or the salt between the polyallylamine and the polyester having the free carboxylic acid; the pigment derivative represented by the formula (1); and the pigment ranges from 5:1:100 to 200:15:100.

9. A ink-jet ink comprising the pigment dispersion according to claim 1.

10. A ink-jet ink comprising the pigment dispersion according to claim 2.

11. A ink-jet ink comprising the pigment dispersion according to claim 3.

12. A ink-jet ink comprising the pigment dispersion according to claim 4.

13. An ink for print comprising the pigment dispersion according to claim 1.

14. An ink for print comprising the pigment dispersion according to claim 2.

15. An ink for print comprising the pigment dispersion according to claim 3.

16. An ink for print comprising the pigment dispersion according to claim 4.

17. The pigment dispersion according to claim 1, wherein the condensate or the salt has 2-50 of amine value.

18. The pigment dispersion according to claim 1, wherein the condensate or the salt has 2-50 of acid value.

19. The pigment dispersion according to claim 1, wherein the pigment derivative represented by the formula (1) is prepared by introducing a sulfonic acid or a carboxylic acid into a pigment molecule, and then reacting the acid group containing molecule with a primary amine.

* * * * *